United States Patent

Urata et al.

[11] Patent Number: 5,822,623
[45] Date of Patent: Oct. 13, 1998

[54] CAMERA WITH VIBRATION CORRECTING FUNCTION

[75] Inventors: Keishi Urata; Sueyuki Ohishi, both of Tokyo; Tatsuo Amanuma, Ageo; Yoshio Imura, Kawasaki, all of Japan

[73] Assignee: Nikon Corporation, Tokyo, Japan

[21] Appl. No.: 815,067

[22] Filed: Mar. 11, 1997

Related U.S. Application Data

[63] Continuation of Ser. No. 377,325, Jan. 24, 1995, abandoned.

[30] Foreign Application Priority Data

Apr. 27, 1994 [JP] Japan ................................. 6-112200
Apr. 27, 1994 [JP] Japan ................................. 6-112201

[51] Int. Cl.$^6$ ................................................. G03B 17/00
[52] U.S. Cl. ............................................. 396/52; 396/55
[58] Field of Search ........................ 396/52–55; 348/169, 348/208

[56] References Cited

U.S. PATENT DOCUMENTS

| | | | |
|---|---|---|---|
| 5,237,365 | 8/1993 | Miyazawa | 354/456 |
| 5,245,378 | 9/1993 | Washisu | 354/410 |
| 5,266,988 | 11/1993 | Washisu | 354/70 |
| 5,335,042 | 8/1994 | Imafuji et al. | 354/430 |
| 5,389,997 | 2/1995 | Ohishi | 354/430 |
| 5,416,554 | 5/1995 | Hamada et al. | 354/400 |

FOREIGN PATENT DOCUMENTS 4-301822  10/1992  Japan .

OTHER PUBLICATIONS

English translation of Japanese Laid Open Patent Application No. 4–301822.

*Primary Examiner*—D. Rutledge

[57] ABSTRACT

A camera with vibration correcting function is provided with a plurality of vibration detecting devices for detecting the vibration of the camera, a plurality of vibration correcting devices for effecting vibration correction control in conformity with the respective outputs of the vibration detecting devices, and an abnormality detecting device for detecting the abnormality of the output of the vibration detecting devices, and only the vibration correcting device corresponding to the vibration detecting device having the output for which abnormality has been detected by the abnormality detecting device is inhibited from effecting the vibration correction control.

14 Claims, 9 Drawing Sheets

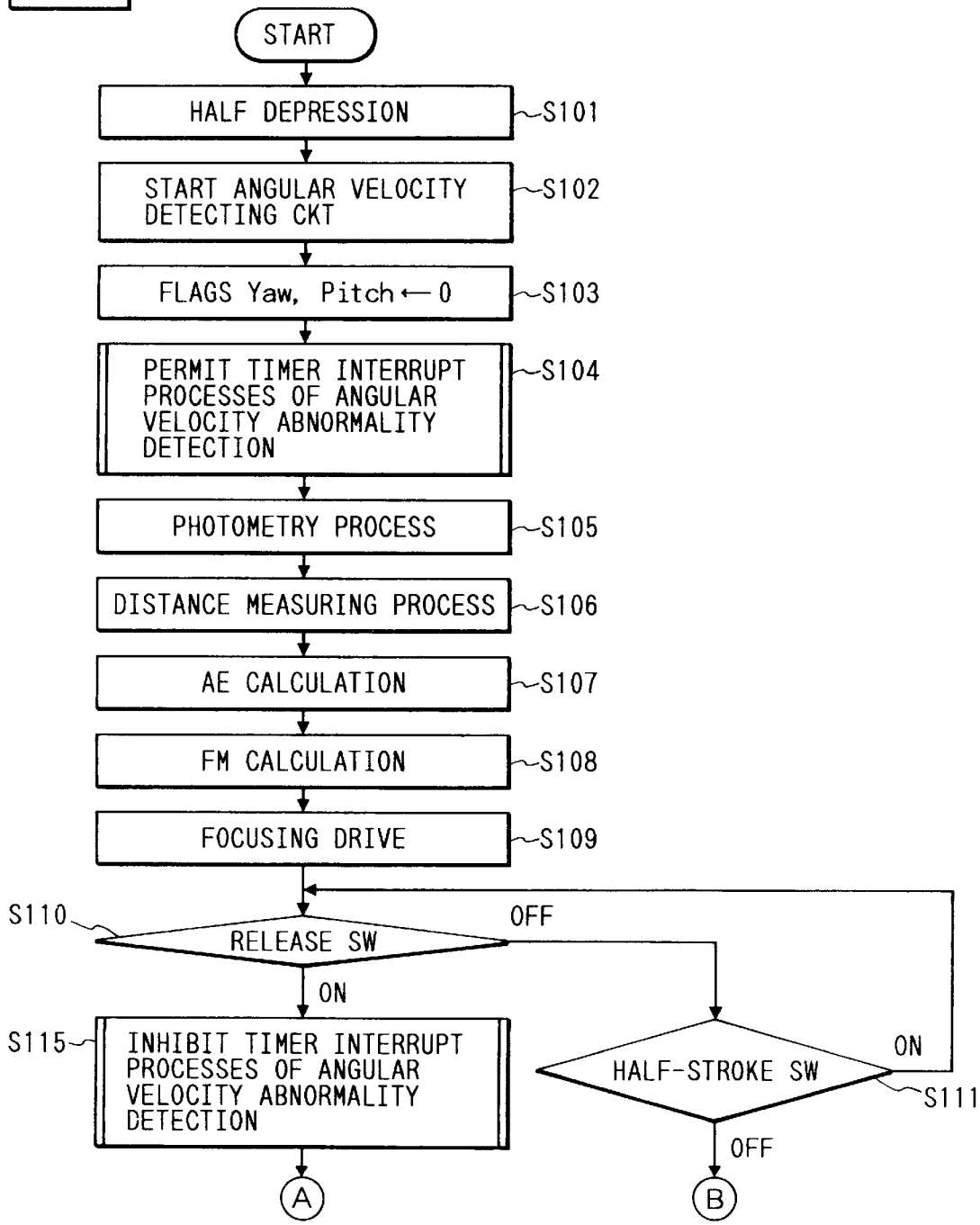

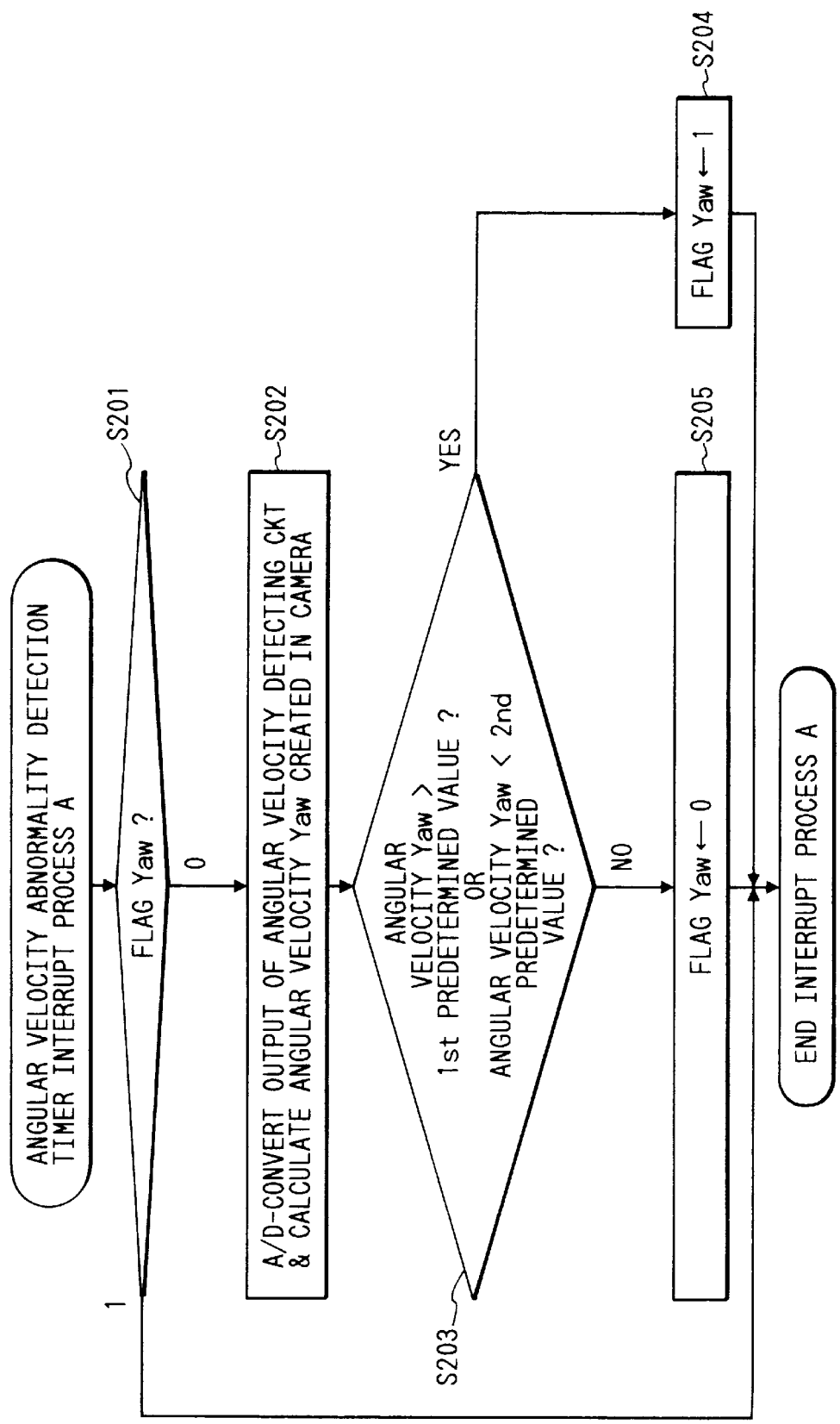

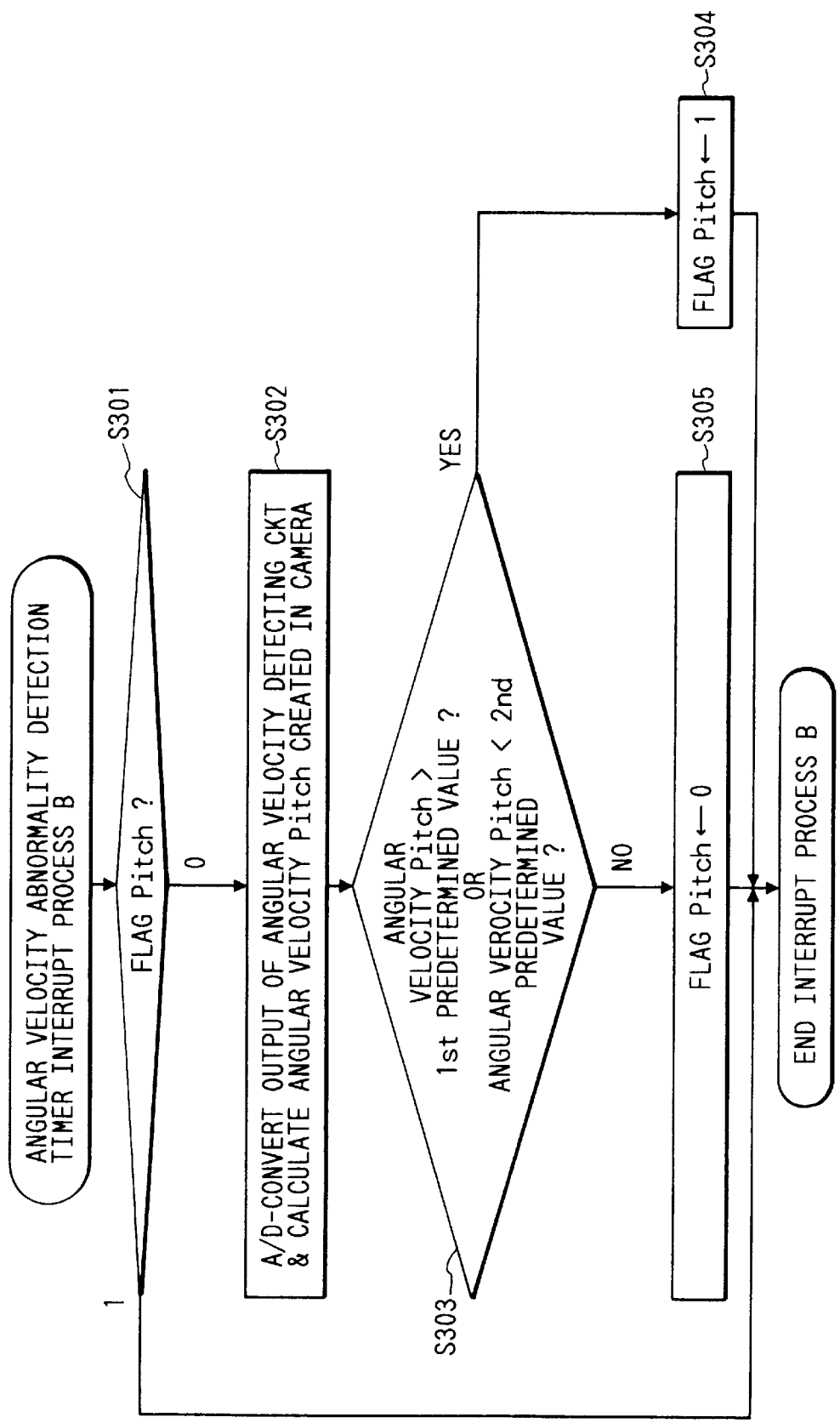

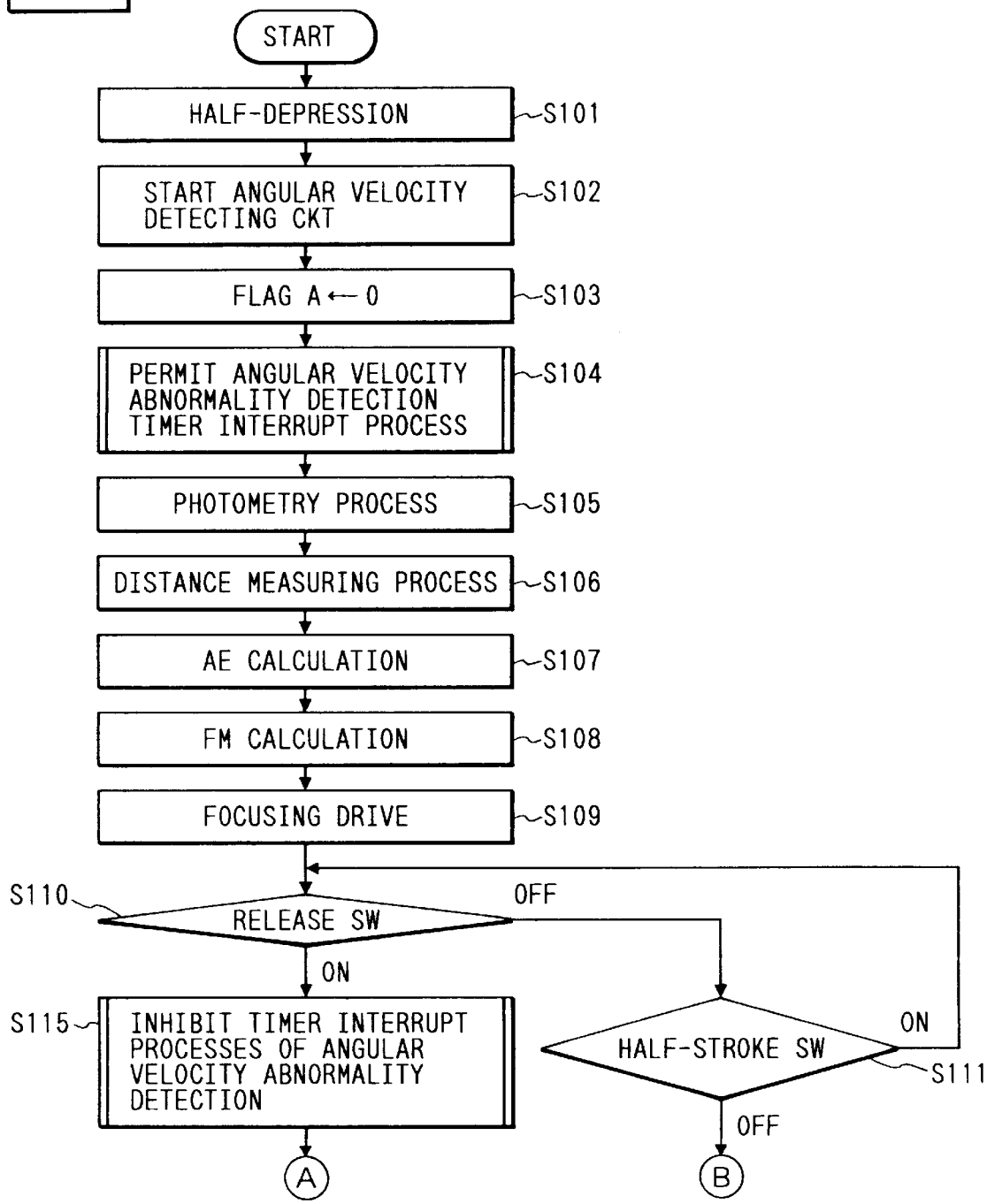

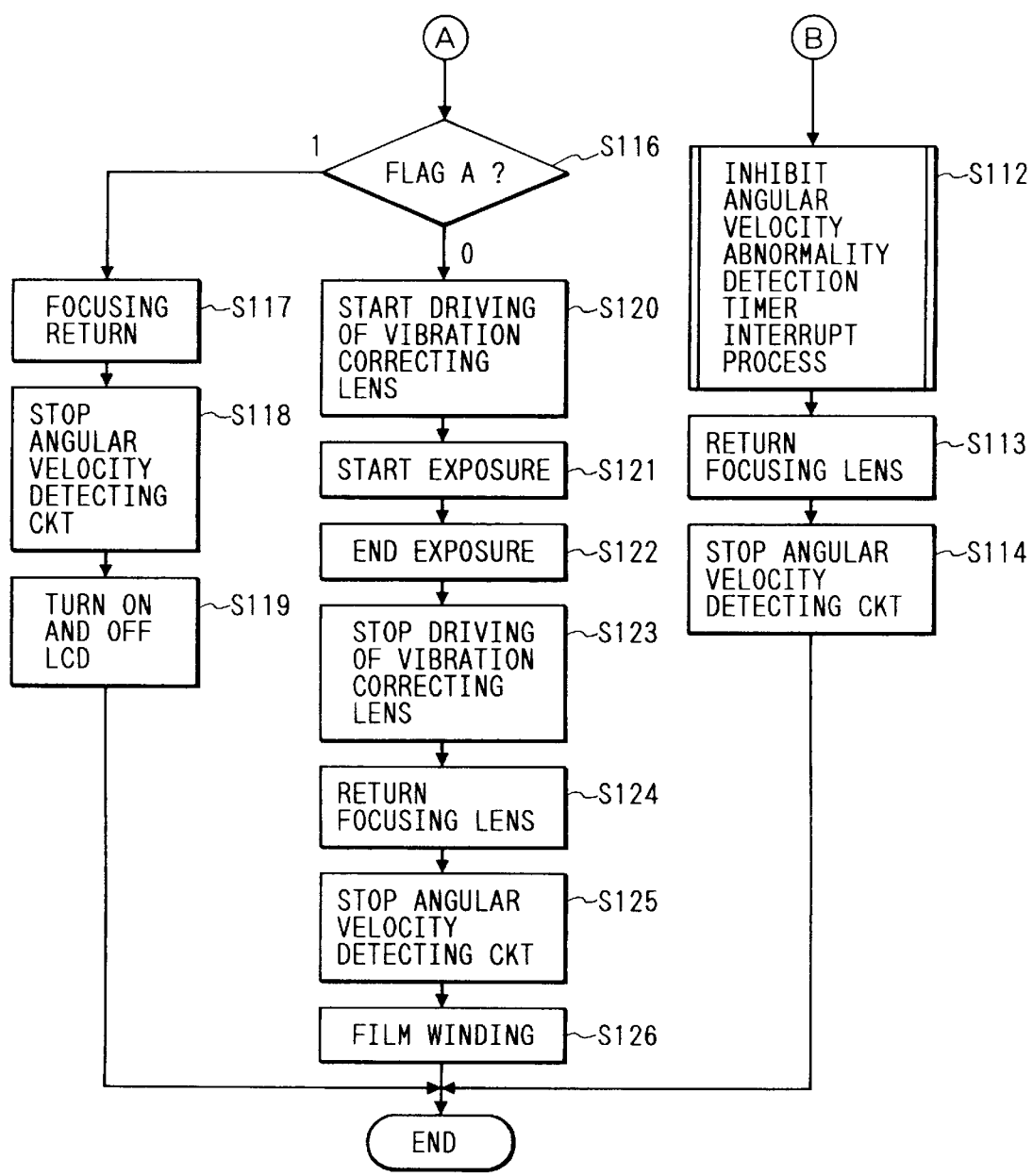

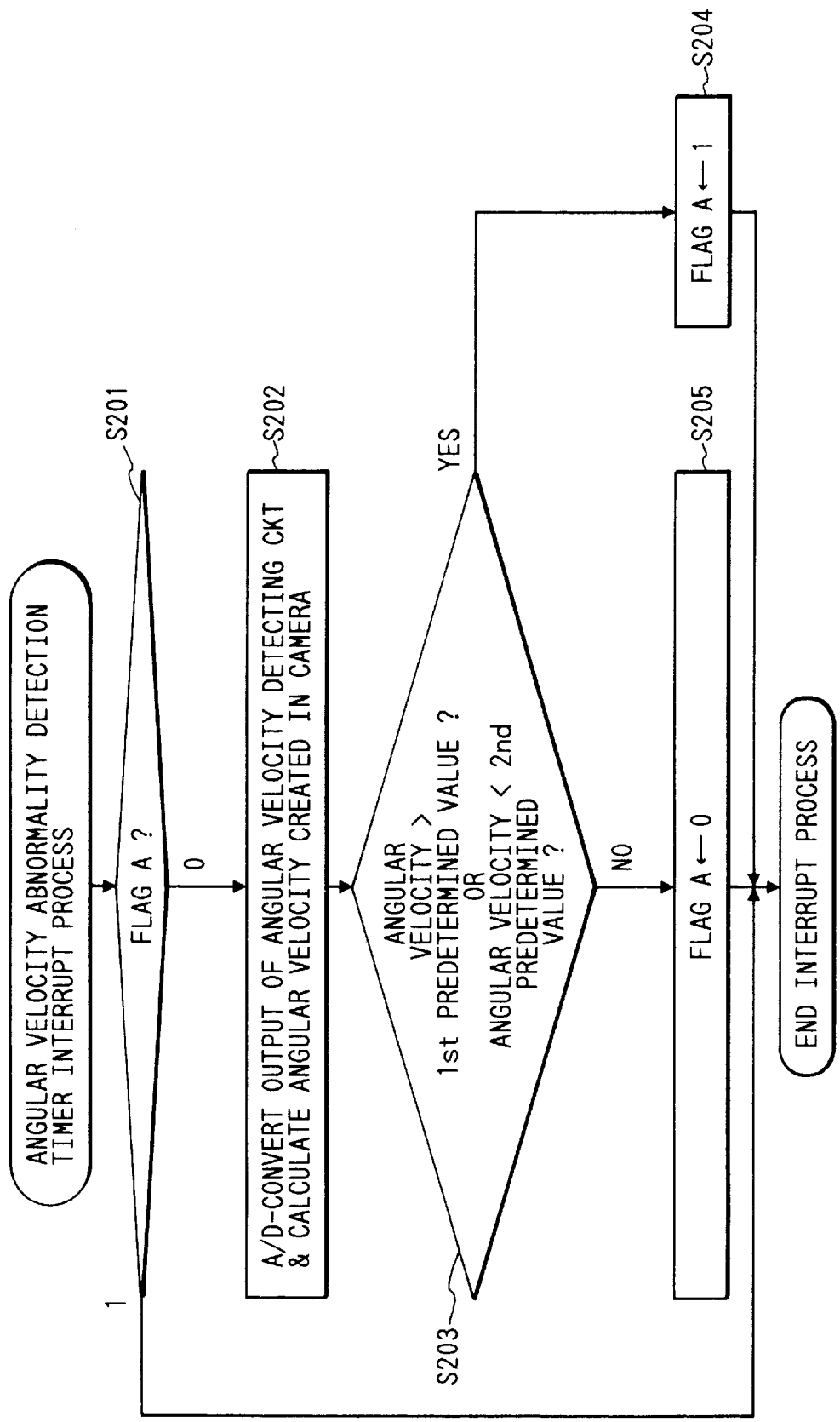

CAMERA WITH VIBRATION CORRECTING FUNCTION

This application is a continuation, of application number 08/377,325, filed Jan. 24, 1995, now abandoned.

BACKGROUND OF THE INVENTION

1. Field of the Invention

This invention relates to a camera with vibration correcting function.

2. Related Background Art

In a camera with vibration correcting function of this kind according to the prior art, vibration correction control has always been effected by an output from a vibration detecting device irrespective of the state of the output of the vibration detecting device.

However, when a proper output signal becomes unable to be obtained from the vibration detecting device due to some factor or other, there has been the problem that if vibration correction control is further effected by a signal obtained from the vibration detecting device wrong vibration correction control is effected.

SUMMARY OF THE INVENTION

The present invention has been made in view of the above-noted problems and an object thereof is to inhibit vibration correction control when the output of a sensor is in an abnormal state, thereby preventing wrong vibration correction control from being effected during exposure.

To achieve this object of the camera of the present invention, with vibration correcting function is provided with vibration detecting devices for detecting the vibration of the camera, a plurality of vibration correcting devices for effecting vibration correction control in conformity with the respective outputs of the vibration detecting devices, and an abnormality detecting device for detecting the abnormality of the outputs of the vibration detecting devices, and is designed such that when the abnormality detecting device detects abnormality, the vibration correction control is inhibited from being effected.

The camera of the present invention with vibration correcting function is provided with a plurality of vibration detecting devices for detecting the vibration of the camera, a plurality of vibration correcting devices for effecting vibration correction control in conformity with the respective outputs of the vibration detecting devices, and an abnormality detecting device for detecting the abnormality of the outputs of the vibration detecting devices, and is designed such that only the vibration correction device corresponding to the vibration detecting device of the output of which abnormality has been detected by the abnormality detecting device is inhibited from effecting the vibration correction control.

In the camera of the above-described construction with vibration correcting function, design is made such that when the abnormality detecting device detects the abnormality of the output of one of the vibration detecting devices, only the vibration correcting device corresponding to that vibration detecting device of the output of which the abnormality has been detected by the abnormality detecting device is inhibited from effecting vibration correction control and therefore, wrong vibration correction control can be prevented from being effected during exposure.

The present invention has been made in view of the above-noted problems and an object thereof is to inhibit a photographing operation when the output of a sensor is in an abnormal state, thereby preventing photographing under wrong vibration correction control from being effected.

To achieve this object, the camera of the present invention with vibration correcting function is provided with a photographing operation device for effecting the photographing operation of the camera, a vibration detecting device for detecting the vibration of the camera, a vibration correcting device for effecting vibration correction control in conformity with the output of the vibration detecting device, and an abnormality detecting device for detecting the abnormality of the output of the vibration detecting device, and is designed such that when the abnormality detecting device detects the abnormality of the output of the vibration detecting device, the photographing operation device is inhibited from effecting the photographing operation.

In the camera of the above-described construction with vibration correcting function, design is made such that when the abnormality detecting device detects the abnormality of the output of the vibration detecting device, the photographing operation is inhibited and therefore, the photographing operation under wrong vibration correction control can be prevented from being effected.

BRIEF DESCRIPTION OF THE DRAWINGS

FIG. 3 is a flow chart showing the angular velocity abnormality detection timer interrupt process in an embodiment of the camera with vibration correcting function according to the present invention.

FIG. 4 is a flow chart showing the angular velocity abnormality detection timer interrupt process in an embodiment of the camera with vibration correcting function according to the present invention.

FIG. 6 is comprised of FIGS. 6A and 6B showing flow charts each illustrating an embodiment of the camera with vibration correcting function according to the present invention.

FIG. 7 is a flow chart showing the angular velocity abnormality detection timer interrupt process in an embodiment of the camera with vibration correcting function according to the present invention.

DESCRIPTION OF THE PREFERRED EMBODIMENTS

Figure 1:
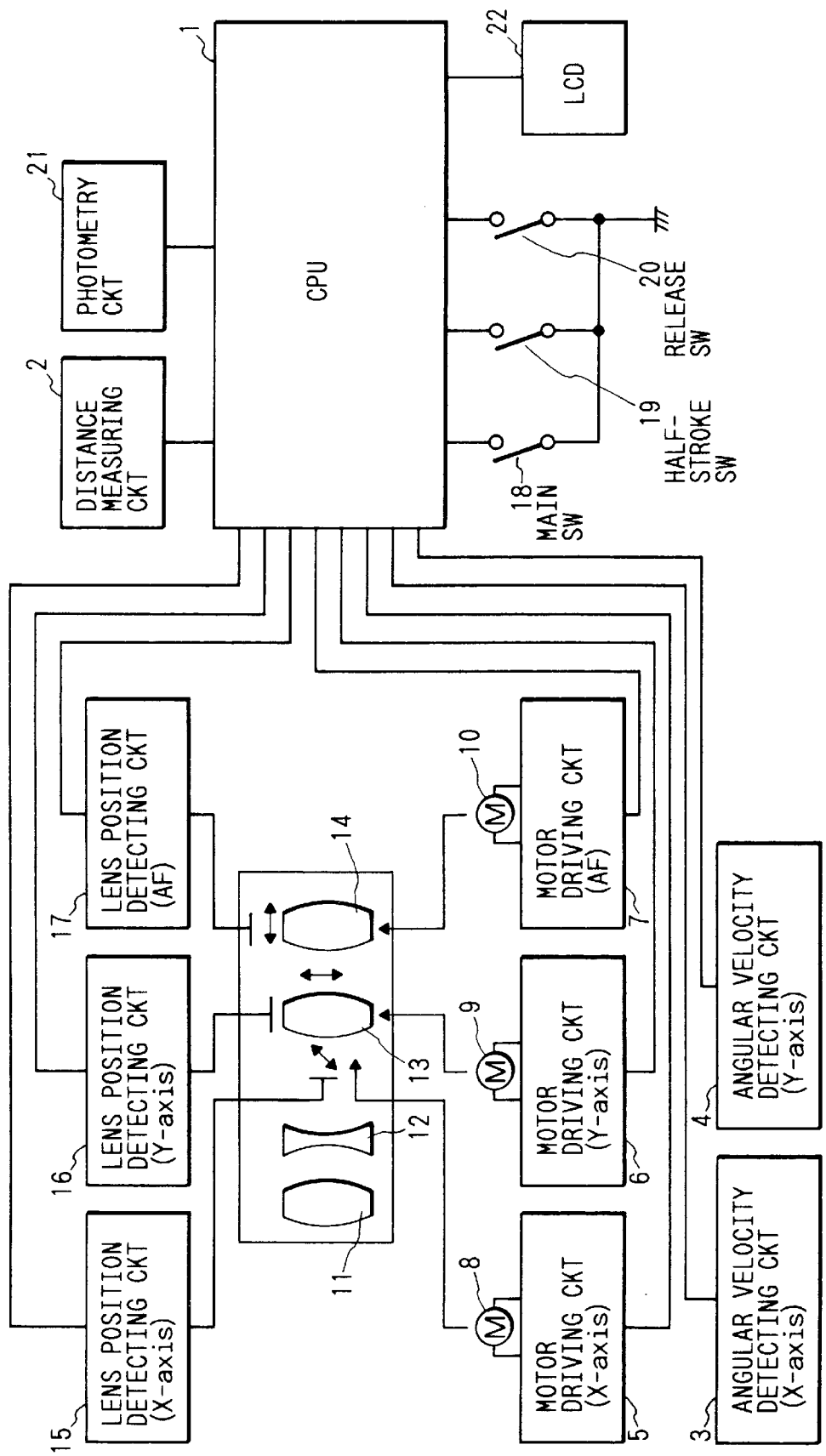
FIG. 1 is a block diagram showing an embodiment of a camera with vibration correcting function according to the present invention.

FIG. 1 is a block diagram showing an embodiment of a camera with vibration correcting function according to the present invention.

In FIG. 1, a distance measuring circuit 2, angular velocity detecting circuits 3 and 4, a main switch 18, a half-stroke switch 19, a release switch 20, a photometry circuit 21 and an LCD 22 are connected to a CPU 1. Motors 8 and 9 for driving a vibration correcting lens 13 are connected to motor driving circuits 5 and 6, respectively, and the motor driving circuits 5 and 6 are connected to the CPU 1. A motor 10 for driving a focusing lens 14 is connected to a motor driving circuit 7, which in turn is connected to the CPU 1. Lens position detecting circuits 15 and 16 detect the position of the vibration correcting lens 13. A lens position detecting circuit 17 detects the position of the focusing lens 14. The lens position detecting circuits 15, 16 and 17 are connected to the CPU 1. Lenses 11, 12, the vibration correcting lens 13 and the focusing lens 14 together constitute a photo-taking lens.

The operation of the above-described construction will now be described.

The angular velocity detecting circuits 3 and 4 detect the vibration of the camera and output detection signals conforming to the magnitude of the vibration to the CPU 1. In conformity with the detection signals of the angular velocity detecting circuits 3 and 4, control signals are outputted from the CPU 1 to the motor driving circuits 5 and 6, which thus drive the motors 8 and 9, respectively. Thereby the vibration correcting lens 13 are moved. When the CPU 1 detects the abnormality of the detection signals of the angular velocity detecting circuits 3 and 4, the CPU 1 inhibits vibration correction control from being effected.

Figure 2B:
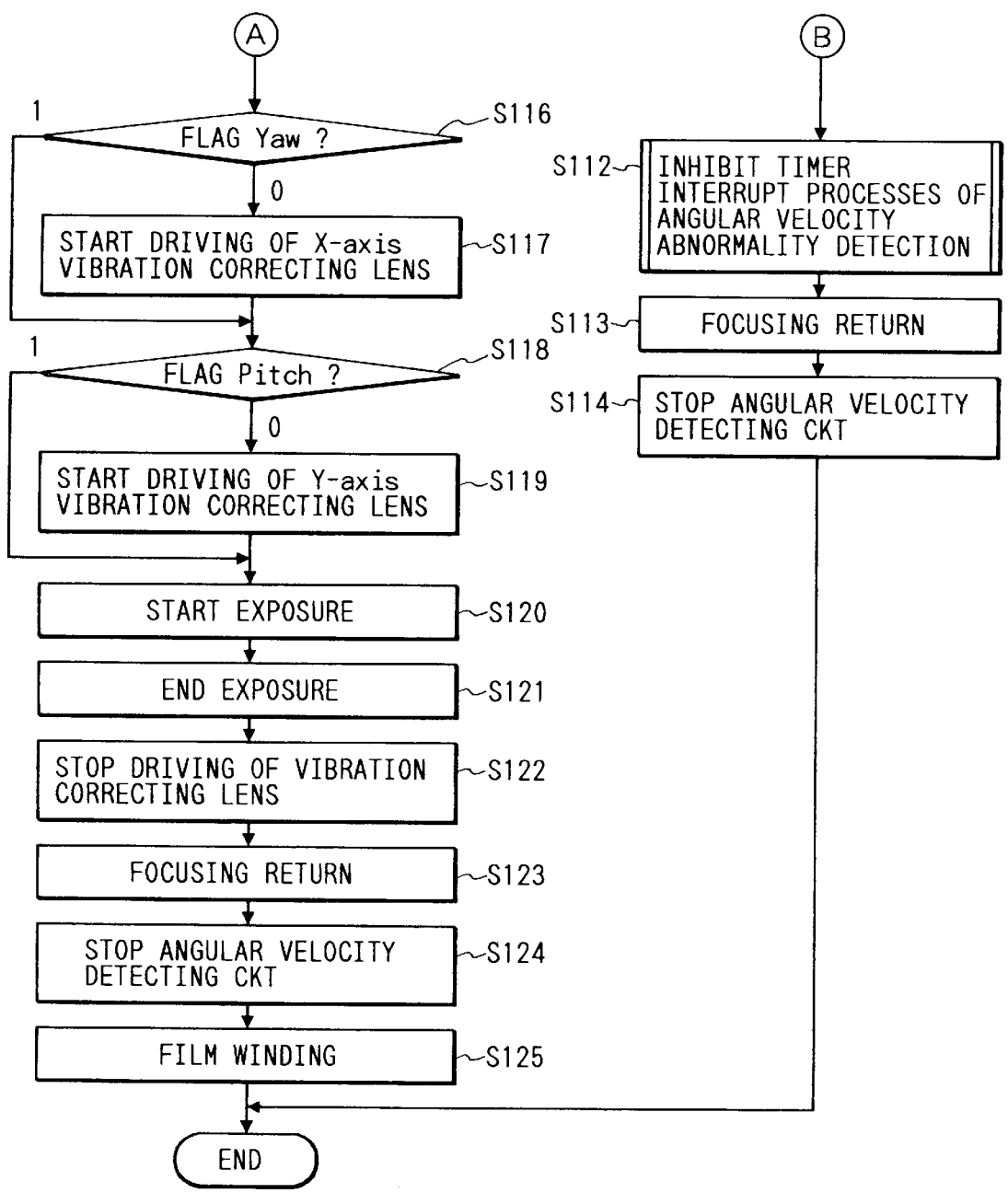
FIG. 2 is comprised of FIGS. 2A and 2B showing flow charts each illustrating an embodiment of the camera with vibration correcting function according to the present invention.

FIGS. 2A and 2B are flow charts illustrating the operation of the CPU 1 of FIG. 1.

In FIGS. 2A and 2B, at a step S101, the half depression of a release button (the closing of the half-stroke switch 19) is detected. At a step S102, the angular velocity detecting circuits 3 and 4 are started, and detection signals conforming to the magnitude of the vibration are outputted to the CPU 1. At a step S103, flags Yaw and Pitch representative of the abnormality of the angular velocity detection signals are cleared. At a step S104, the timer interrupt processes A and B for angular velocity abnormality detection are permitted. At a step S105, the photometry process is carried out, and at a step S106, the distance measuring process is carried out. At a step S107, AE (auto exposure) calculation is effected, at a step S108, FM (flashmatic) calculation is effected, and at a step S109, focusing drive is effected. The timer interrupt processes A and B for angular velocity abnormality detection will be described later in conjunction with FIGS. 3 and 4.

At a step S110, the full depression of the release button (the closing of the release switch 20) is judged. If the release switch 20 is OFF, whether the release button is still half-depressed (the closing of the half-stroke switch 19) is judged at a step S111. If the half-stroke switch 19 is ON, return is made to the step S110, and if the half-stroke switch 19 is OFF, it is judged that photographing should be suspended, and at a step S112, the timer interrupt processes A and B for angular velocity abnormality detection are inhibited, and at a step S113, focusing return is effected, and at a step S114, the angular velocity detecting circuits 3 and 4 are stopped, and then the program is ended.

If at the step S110, it is judged that the release switch 20 is ON, at a step S115, the timer interrupt processes A and B for angular velocity abnormality detection are inhibited, and at a step S116, the value of the flag Yaw is judged. If the value of the flag Yaw is 1, it is judged that the angular velocity is abnormal, and the vibration correction control in the direction of the X-axis is not effected, and advance is made to a step S118. If at the step S116, the value of the flag Yaw is 0, it is judged that there is no abnormality in the angular velocity, and at a step S117, the driving of the vibration correcting lens 13 in the direction of the X-axis is started.

At the step S118, the value of the flag Pitch is judged. If the value of the flag Pitch is 1, it is judged that the angular velocity is abnormal, and the vibration correction control in the direction of the Y-axis is not effected, and advance is made to a step S120.

If at the step S118, the value of the flag Pitch is 0, it is judged that there is no abnormality in the angular velocity, and at a step S119, the driving of the vibration correcting lens 13 in the direction of the Y-axis is started. At the step S120, exposure is started, and at a step S121, the exposure is ended. At a step S122, the driving of the vibration correcting lens 13 is stopped (if this lens is not driven, it remains stopped), and at a step S123, focusing return is effected, and at a step S124, the angular velocity detecting circuits 3 and 4 are stopped. At a step S125, film is wound up in preparation for the next photographing, and the program is ended.

FIG. 3 is a subroutine showing the angular velocity abnormality detection timer interrupt process A, and the abnormality of the angular velocity in Yaw direction for drive-controlling the X-axis of the vibration correcting device is detected. This is the timer interrupt process permitted at the step S104 of FIG. 2A and activated at each predetermined time (e.g. 2 ms) until inhibited at the step S112 of FIG. 2B and step S115 of FIG. 2A.

In FIG. 3, at a step S201, the value of the flag Yaw is judged. If the value of the flag Yaw is 1, it is judged that the abnormality of the angular velocity has already been detected, and the interrupt process is ended. If at the step S201, the value of the flag Yaw is 0, at a step S202, the outputs of the angular velocity detecting circuits 3 and 4 are A/D-converted and the angular velocity created in the camera is calculated. At a step S203, whether the detected angular velocity exceeds a first predetermined value or is less than a second predetermined value is judged. If the angular velocity exceeds the first predetermined value or is less than the second predetermined value, it is judged that the angular velocity is abnormal, and the value of the flag Yaw is rendered into 1 and the interrupt process is ended.

If at the step S203, the angular velocity is less than the first predetermined value and greater than the second predetermined value, it is judged that the angular velocity is normal, and the value of the flag Yaw is rendered into 0 and the interrupt process is ended.

FIG. 4 is a subroutine showing the angular velocity abnormality detection timer interrupt process B, and the abnormality of the angular velocity in Pitch direction for drive-controlling the Y-axis of the vibration correcting device. This is the timer interrupt process permitted at the step S104 of FIG. 2A and activated at each predetermined time (e.g. 2 ms) until inhibited at the step S112 of FIG. 2B and S115 of FIG. 2A.

In FIG. 4, at a step S301, the value of the flag Pitch is judged. If the value of the flag Pitch is 1, it is judged that the abnormality of the angular velocity has already been detected, and the interrupt process is ended. If at the step S301, the value of the flag Pitch is 0, at a step S302, the outputs of the angular velocity detecting circuits 3 and 4 are A/D-converted and the angular velocity created in the camera is calculated. At a step S303, whether the detected angular velocity exceeds a first predetermined value or is less than a second predetermined value is judged. If the angular velocity exceeds the first predetermined value or is less than the second predetermined value, it is judged that the angular velocity is abnormal, and the value of the flag Pitch is rendered into 1 and the interrupt process is ended.

If at the step S303, the angular velocity is less than the first predetermined value and greater than the second predetermined value, it is judged that the angular velocity is normal, and the value of the flag Pitch is rendered into 0 and the interrupt process is ended.

As described above, in the camera with vibration correcting function according to the present invention, the outputs of the angular velocity detecting circuits 3 and 4 are detected and when the output of the angular velocity detecting circuit 3 or 4 is abnormal, vibration correction control is inhibited from being effected and therefore, it becomes possible to prevent wrong vibration correction.

While the present invention has been described above with respect to an embodiment thereof, various modifications are possible in accordance with the technical idea of the present invention. For example, when the abnormality of the detected angular velocity is to be judged, it is also possible to judge the angular velocity to be abnormal only when the angular velocity exceeds a predetermined value or when the angular velocity is less than the predetermined value. Also, when a plurality of angular velocities are needed for vibration correction control, it becomes possible to inhibit vibration correction control only in the vibration direction of the angular velocity judged to be abnormal. It is also possible to use an indicating device to indicate to a photographer that the abnormality of the angular velocity has been detected.

Also, in the embodiment, one angular velocity detecting circuit is used in one direction, but when a plurality of angular velocity detecting circuits are used in one direction, for example, when a plurality of angular velocity detecting circuits differing in detection accuracy are used in one direction, the present invention can also be applied.

As described above, according to the camera of the present invention with vibration correcting function, design is made such that when the abnormality detecting device detects the abnormality of the output of the vibration detecting device, only the vibration correcting device corresponding to the vibration detecting device of the output of which the abnormality has been detected by the abnormality detecting device is inhibited from effecting vibration correction control and therefore, it becomes possible to prevent wrong vibration correction control from being effected during exposure.

Another embodiment of the present invention will hereinafter be described with reference to the drawings.

Figure 5:
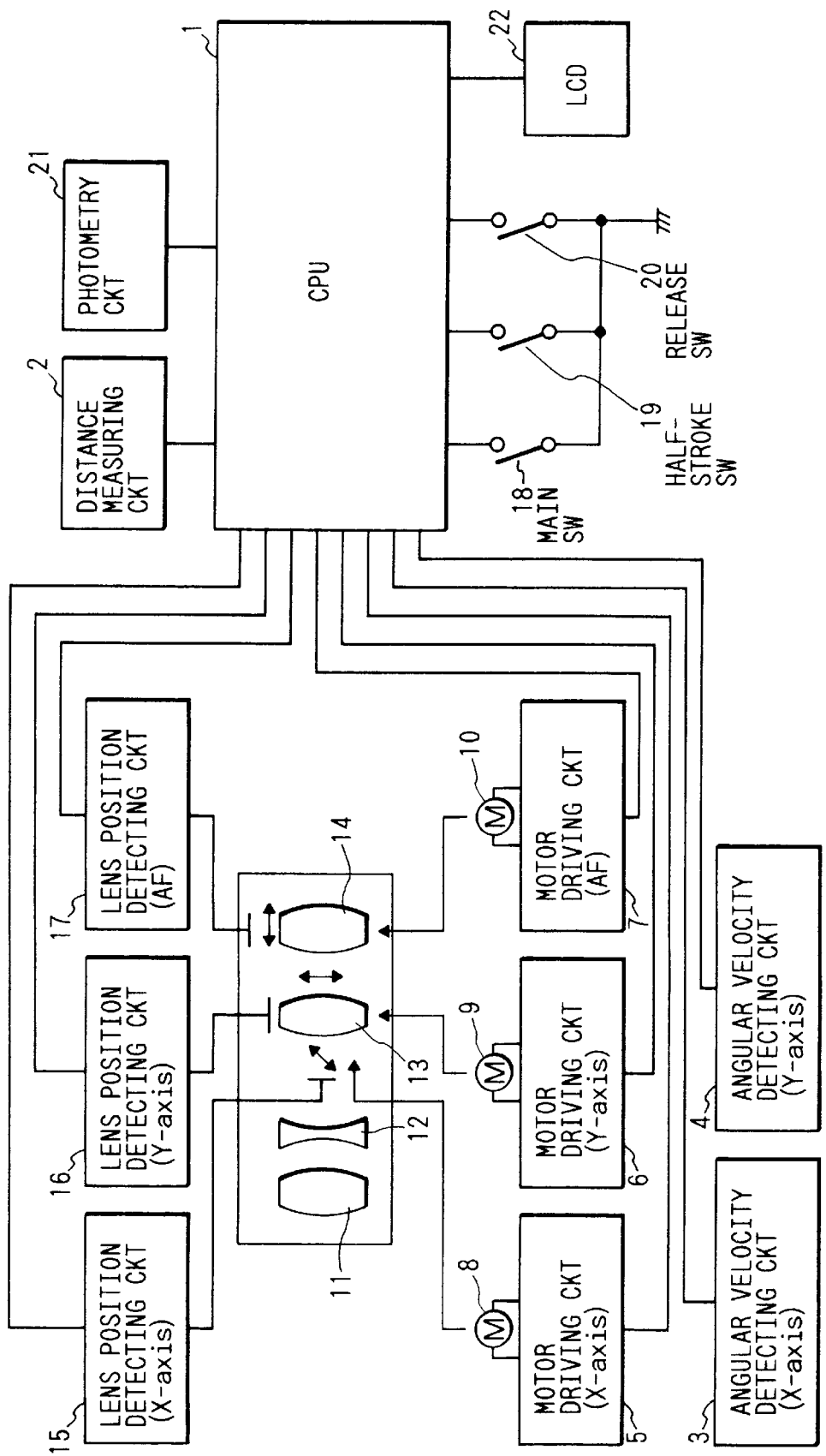
FIG. 5 is a block diagram showing an embodiment of the camera with vibration correcting function according to the present invention.

FIG. 5 is a block diagram showing an embodiment of the camera with vibration correcting function according to the present invention.

In FIG. 5, a distance measuring circuit 2, angular velocity detecting circuits 3 and 4, a main switch 18, a half-stroke switch 19, a release switch 20, a photometry circuit 21 and an LCD 22 are connected to a CPU 1. Motors 8 and 9 for driving a vibration correcting lens 13 are connected to motor driving circuits 5 and 6, respectively, and the motor driving circuits 5 and 6 are connected to the CPU 1. A motor 10 for driving a focusing lens 14 is connected to a motor driving circuit 7, which in turn is connected to the CPU 1. Lens position detecting circuits 15 and 16 detect the position of the vibration correcting lens 13. A lens position detecting circuit 17 detects the position of the focusing lens 14. The lens position detecting circuits 15, 16 and 17 are connected to the CPU 1. Lenses 11, 12 the vibration correcting lens 13 and the focusing lens 14 together constitute a photo-taking lens.

The operation of the above-described construction will now be described.

The angular velocity detecting circuits 3 and 4 detect the vibration of the camera and output detection signals conforming to the magnitude of the vibration to the CPU 1. In conformity with the detection signals of the angular velocity detecting circuits 3 and 4, control signals are outputted from the CPU 1 to the motor driving circuits 5 and 6, which thus drive the motors 8 and 9, respectively, whereby the vibration correcting lens 13 is moved. When the CPU 1 detects the abnormality of the detection signals of the angular velocity detecting circuits 3 and 4, the LCD 22 is turned on and off to thereby inhibit photographing.

FIGS. 6A and 6B are flow charts illustrating the operation of the CPU 1 of FIG. 5.

In FIGS. 6A and 6B, at a step S101, the half depression of a release button (the closing of the half-stroke switch 19) is detected. At a step S102, the angular velocity detecting circuits 3 and 4 are started and output detection signals conforming to the vibration to the CPU 1. At a step S103, a flag A representative of the abnormality of the angular velocity detection signals is cleared. At a step S104, the timer interrupt process for angular velocity abnormality detection is permitted. At a step S105, the photometry process is carried out, and at a step S106, the distance measuring process is carried out. At a step S107, AE (auto exposure) calculation is effected, at a step S108, FM (flashmatic) calculation is effected, and at a step S109, focusing drive is effected. At a step S110, the full depression of the release button (the closing of the release switch 20) is judged. If the release switch 20 is OFF, whether the release button is still half-depressed (the closing of the half-stroke switch 19) is judged at a step S111. If the half-stroke switch 19 is ON, return is made to the step S110, and if the half-stroke switch 19 is OFF, it is judged that photographing should be suspended, and at a step S112, the timer interrupt process for angular velocity abnormality detection is inhibited, at a step S113, focusing return is effected, and at a step S114, the angular velocity detecting circuits 3 and 4 are stopped, thus ending the program.

If at the step S110, it is judged that the release switch 20 is ON, at a step S115, the timer interrupt process for angular velocity abnormality detection is inhibited, and at a step S116, the value of the flag A is judged. If the value of the flag A is 1, it is judged that the angular velocity is abnormal, and at a step S117, focusing return is effected, and at a step S118, the angular velocity detecting circuits 3 and 4 are stopped, and at a step S119, the LCD 22 is turned on and off to indicate that the angular velocity is abnormal, thus ending the program.

If at the step S116, the value of the flag A is 0, it is judged that there is no abnormality in the angular velocity, and at a step S120, the driving of the vibration correcting lens 13 is started. At a step S121, exposure is started, and at a step S122, the exposure is ended. At a step S123, the driving of the vibration correcting lens 13 is stopped, and at a step S124, focusing return is effected, and at a step S125, the angular velocity detecting circuits 3 and 4 are stopped. At a step S126, film is wound up in preparation for the next photographing, thus ending the program.

FIG. 7 is a flow chart showing the angular velocity abnormality detection timer interrupt process routine, and this is the timer interrupt process permitted at the step S104 of FIG. 6A and activated at each predetermined time (e.g. 2 ms) until inhibited at the step S112 of FIG. 6B and step S115 of FIG. 6A. This interrupt process is used in each of the detection directions of the angular velocity (for example, Yaw and Pitch).

In FIG. 7, at a step S201, the value of the flag A is judged. If the value of the flag A is 1, it is judged that the abnormality of the angular velocity has already been detected, thus ending the interrupt process. If at the step S201, the value of the flag A is 0, at a step S202, the outputs of the angular velocity detecting circuits 3 and 4 are A/D-converted, and the angular velocity created in the camera is calculated. At a step S203, whether the detected angular velocity exceeds a first predetermined value or is less than a second predetermined value is judged. If the angular velocity exceeds first predetermined value or is less than the second predetermined value, it is judged that the angular velocity is abnormal, and the value of the flag A is rendered into 1 and the interrupt process is ended.

If at the step S203, the angular velocity is less than the first predetermined value and greater than the second predetermined value, it is judged that the angular velocity is normal, and the value of the flag A is rendered into 0 and the interrupt process is ended.

As described above, in the camera with vibration correcting function according to the present invention, the outputs of the angular velocity detecting circuits 3 and 4 are detected, and when the output of the angular velocity detecting circuit 3 or 4 is abnormal, vibration correction control is inhibited from being effected and therefore, it becomes possible to prevent wrong vibration correction.

While the present invention has been described above with respect to an embodiment thereof, various modifications are possible in accordance with the technical idea of the present invention. For example, when the abnormality of the detected angular velocity is to be judged, it is also possible to judge the angular velocity to be abnormal only when the angular velocity exceeds a predetermined value or when the angular velocity is less than the predetermined value.

As described above, according to the camera of the present invention with vibration correcting function, design is made such that when the abnormality detecting device detects the abnormality of the output of the vibration detecting device, the vibration correcting device is inhibited from effecting vibration correction control and therefore, it becomes possible to prevent wrong vibration correction control from being effected during exposure.

What is claimed is:

1. A camera having a vibration correcting function, comprising:
   a vibration detecting device to detect vibration of the camera and generate a corresponding output at a constant predetermined sampling time;
   a vibration correcting device to effect vibration correction control in conformity with the output of said vibration detecting device; and
   an abnormality detecting device to detect an abnormality of the output of said vibration detecting device at the constant predetermined sampling time,
   wherein when said abnormality detecting device detects abnormality, vibration correction control is inhibited.

2. A camera having a vibration correcting function, comprising:
   a plurality of vibration detecting devices to detect vibration of the camera and generate an output at a constant predetermined sampling time;
   a plurality of vibration correcting devices to effect vibration correction control in conformity with respective outputs of said plurality of vibration detecting devices; and
   an abnormality detecting device to detect an abnormality of the respective outputs at the constant predetermined sampling time;
   wherein one or more of said plurality of vibration correcting devices corresponding to said vibration detecting device output for which abnormality has been detected is inhibited from effecting vibration correction control.

3. A camera with vibration correcting function according to claim 2, wherein said plurality of vibration detecting devices are a plurality of vibration detecting devices to detect vibrations in a plurality of different directions.

4. A camera with vibration correcting function according to claim 1 or 2, wherein when the outputs of said vibration detecting device(s) exceed(s) a first constant predetermined value or is or are less than a second predetermined value, said abnormality detecting device detects that the outputs of said vibration detecting devices are abnormal.

5. A camera with vibration correcting function according to claim 1 or 2, wherein when the outputs of said vibration detecting device(s) exceed(s) a predetermined value, said abnormality detecting device detects that the outputs of said vibration detecting devices are abnormal.

6. A camera with vibration correcting function according to claim 1 or 2, wherein when the outputs of said vibration detecting device(s) is or are less than a predetermined value, said abnormality detecting device detects that the outputs of said vibration detecting devices are abnormal.

7. A camera with vibration correcting function according to claim 1 or 2, further comprising an indicating device to indicate that the output(s) of said vibration detecting device (s) is or are abnormal.

8. A camera having a vibration correcting function, comprising:
   a photographing operation device to effect a photographing operation of the camera;
   a vibration detecting device to detect vibration of the camera and generate a corresponding output at a constant predetermined sampling time;
   a vibration correcting device to effect vibration correction control in conformity with the output of said vibration detecting device; and
   an abnormality detecting device to detect an abnormality of the output of said vibration detecting device at the constant predetermined sampling time;
   wherein when said abnormality detecting device detects the abnormality of the output, said photographing operation device is inhibited from effecting the photographing operation.

9. A camera with vibration correcting function according to claim 8, wherein when the output of said vibration detecting device exceeds a first predetermined value or is less than a second predetermined value, said abnormality detecting device detects that the output of said vibration detecting device is abnormal.

10. A camera with vibration correcting function according to claim 8, wherein when the output of said vibration detecting device exceeds a predetermined value, said abnormality detecting device detects that the output of said vibration detecting device is abnormal.

11. A camera with vibration correcting function according to claim 8, wherein when the output of said vibration detecting device is less than a predetermined value, said abnormality detecting device detects that the output of said vibration detecting device is abnormal.

12. A camera with vibration correcting function according to claim 8, further comprising an indicating device to indicate the output of said abnormality detecting device, said indicating device indicates that the output of said vibration detecting device is abnormal.

13. A camera having a vibration correction function, comprising:

a vibration detecting device to detect vibration of the camera and generate a corresponding output at a constant predetermined sampling time; and an abnormality detecting device to detect abnormality of the output at the constant predetermined sampling time.

14. A camera having a vibration correction function, comprising:

means for detecting vibration of the camera and generating a corresponding output at a constant predetermined sampling time; and means for detecting abnormality of the output at the constant predetermined sampling time.

* * * * *